Figure 1:
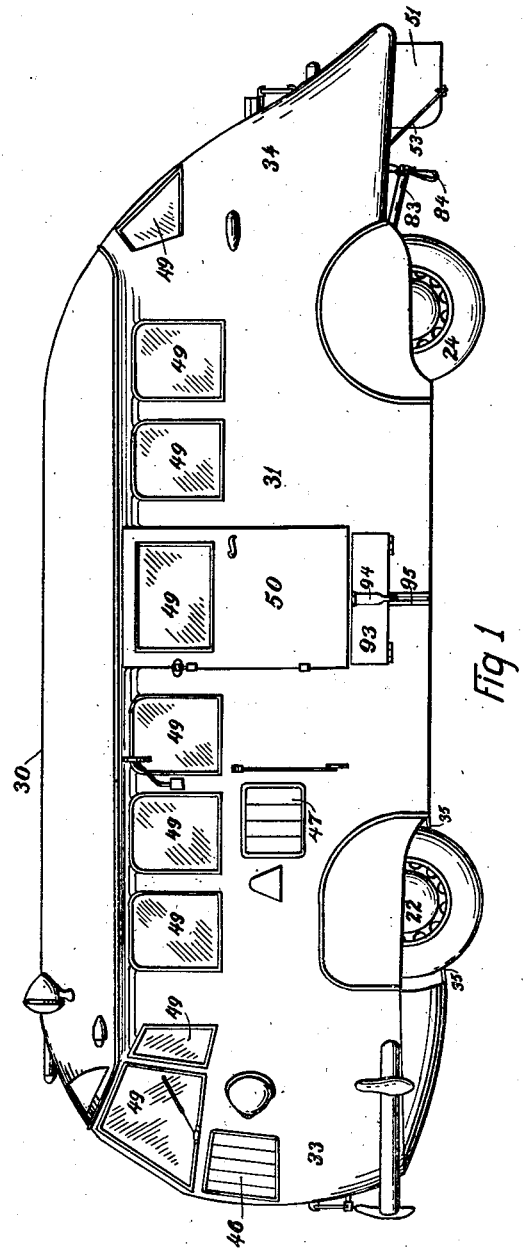

March 31, 1942.     W. P. GRABBE     2,278,255
AMPHIBIAN
Filed Oct. 22, 1938     6 Sheets-Sheet 1

INVENTOR
Wendlin P. Grabbe
BY
ATTORNEY

March 31, 1942.  W. P. GRABBE  2,278,255
AMPHIBIAN
Filed Oct. 22, 1938  6 Sheets-Sheet 2

INVENTOR
Wendlin P. Grabbe
BY
ATTORNEY

March 31, 1942. W. P. GRABBE 2,278,255
AMPHIBIAN
Filed Oct. 22, 1938 6 Sheets-Sheet 3
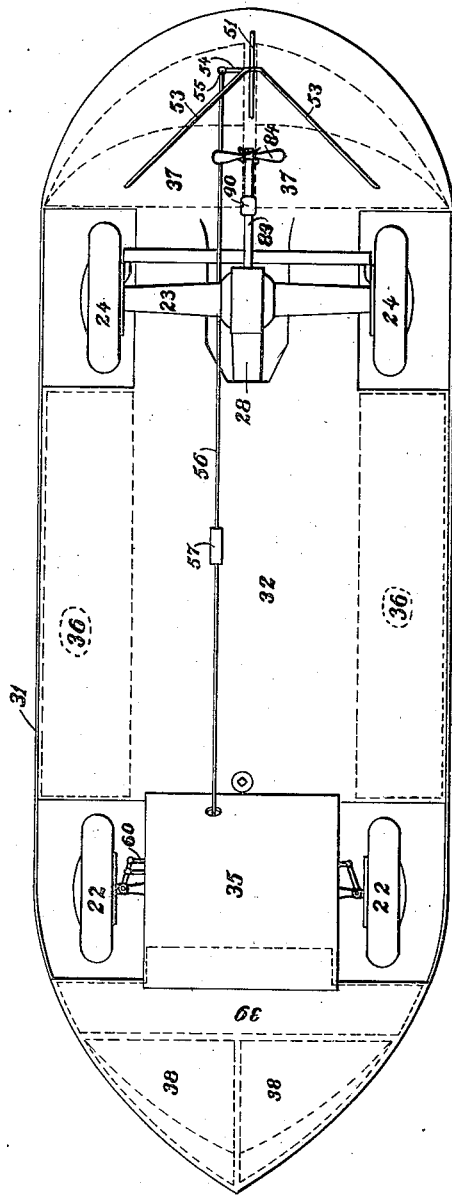
INVENTOR
Wendlin P. Grabbe
BY
ATTORNEY March 31, 1942. W. P. GRABBE 2,278,255
AMPHIBIAN
Filed Oct. 22, 1938 6 Sheets-Sheet 4
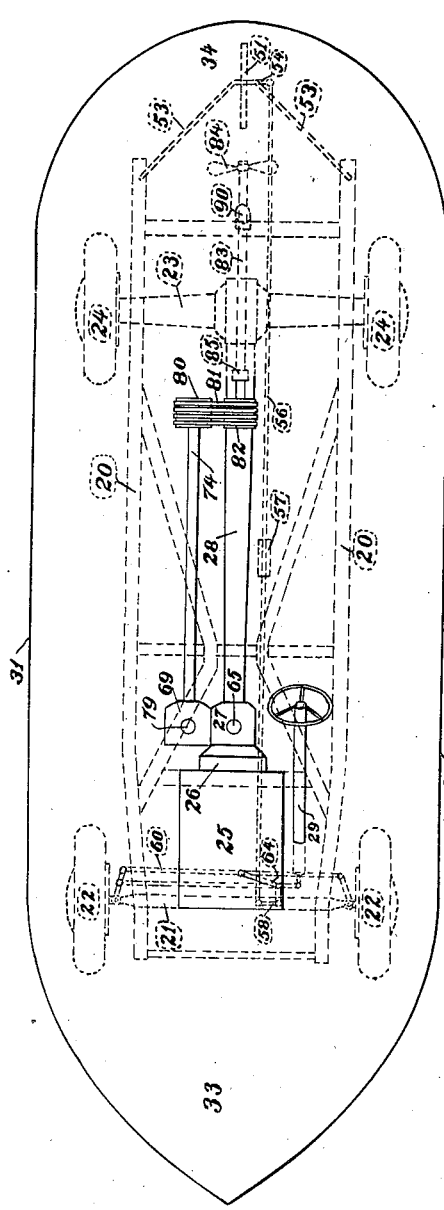
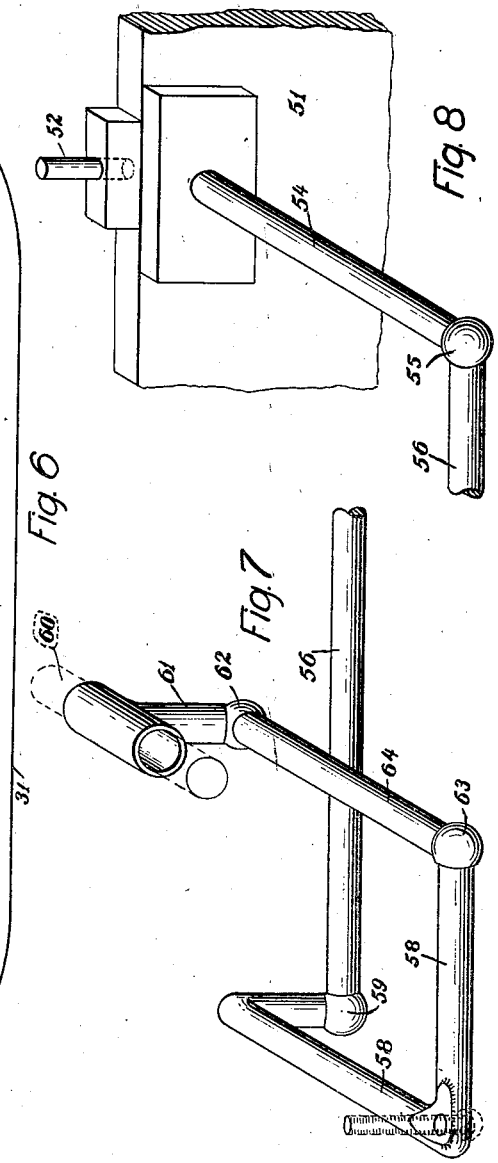
INVENTOR
Wendlin P. Grabbe
BY
ATTORNEY

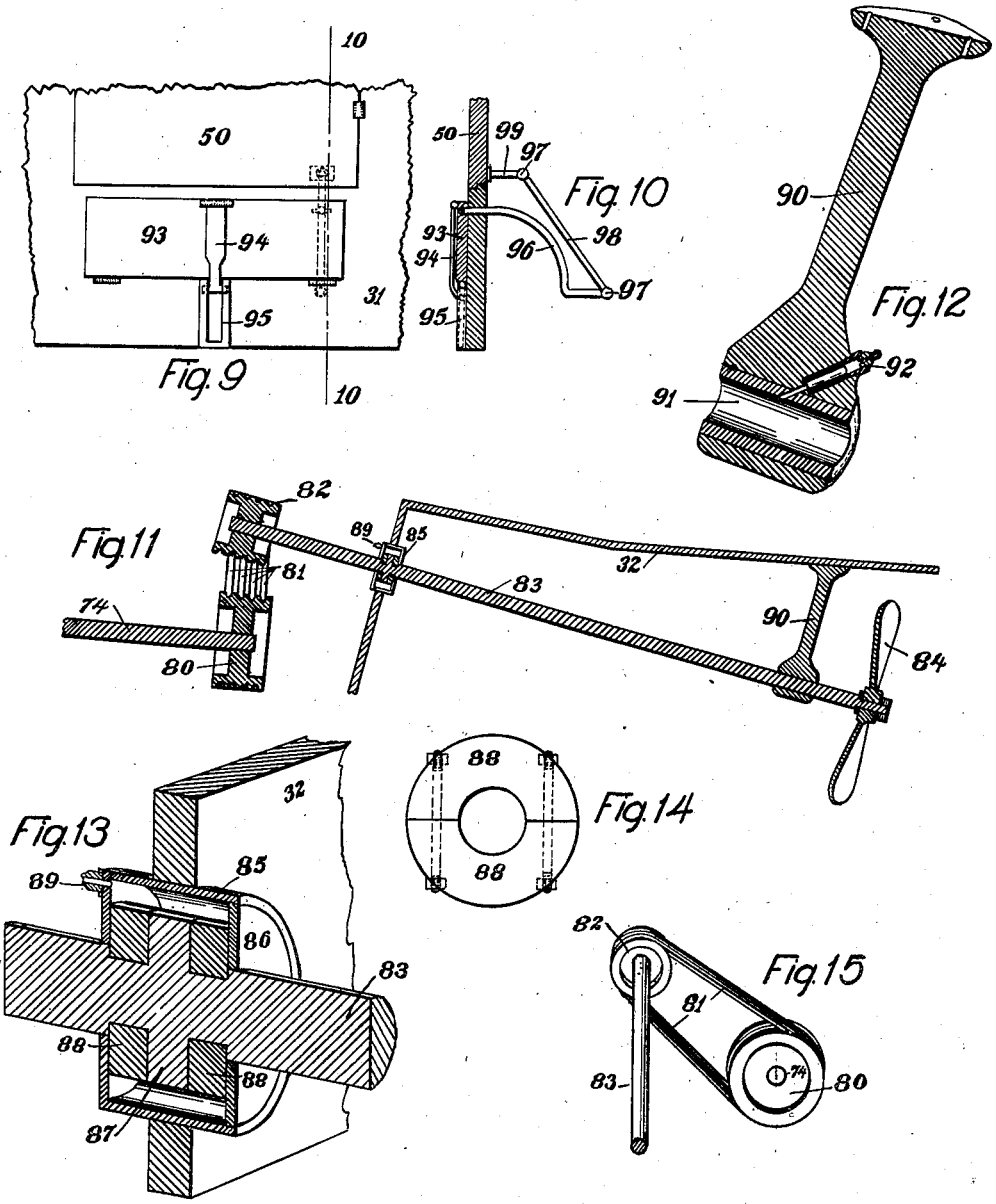

March 31, 1942.  W. P. GRABBE  2,278,255
AMPHIBIAN
Filed Oct. 22, 1938  6 Sheets-Sheet 6
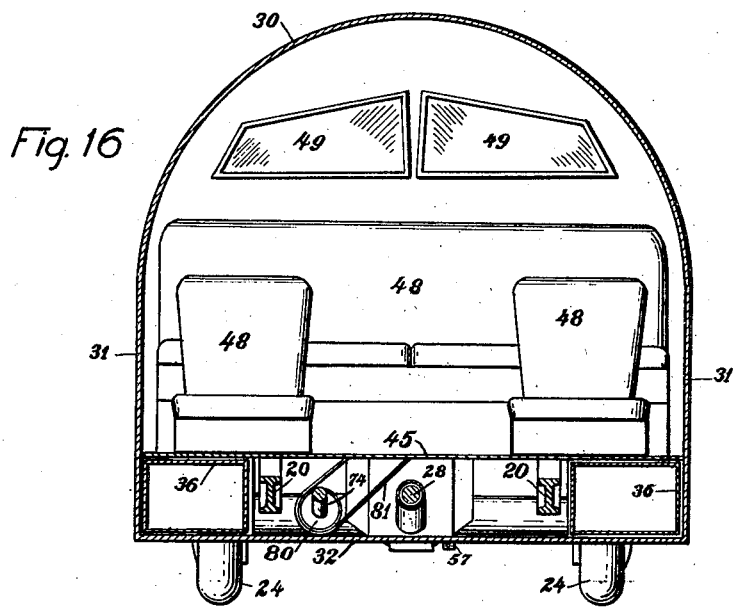
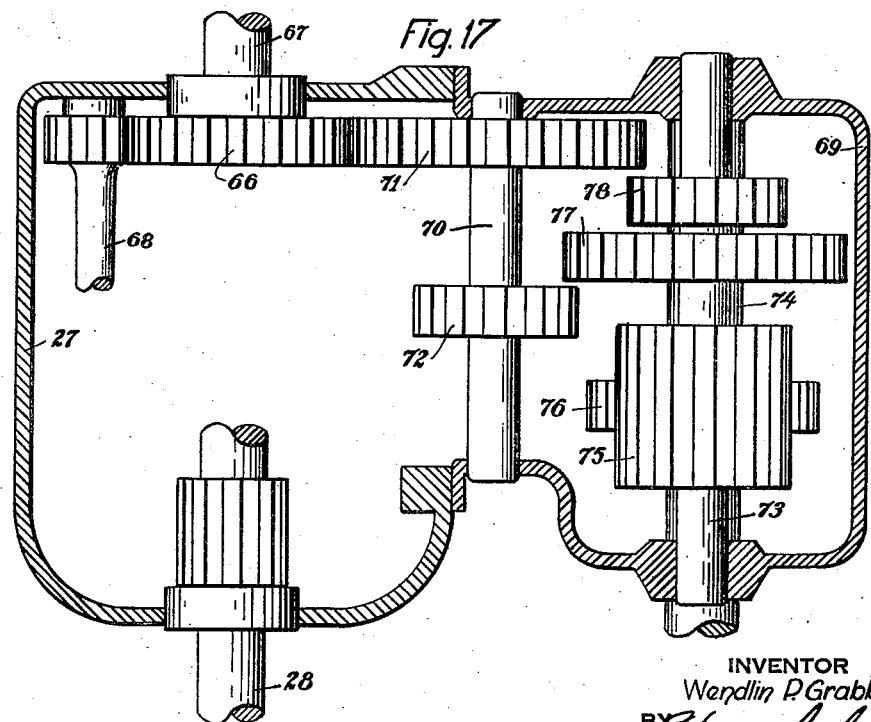
INVENTOR
Wendlin P. Grabbe
BY
ATTORNEY Patented Mar. 31, 1942

2,278,255

UNITED STATES PATENT OFFICE 2,278,255

AMPHIBIAN

Wendlin P. Grabbe, Hays, Kans., assignor to Magic Auto and Collapsible Life Boat Company, Denver, Colo., a corporation Application October 22, 1938, Serial No. 236,377

4 Claims. (Cl. 115—1)

This invention relates to automotive vehicles adapted for travel on both land and water, and has as an object to provide an improved such vehicle arranged to function as a transport unit on either land or water, or both, without any alteration, adjustment or adaptation.

A further object of the invention is to provide an improved automotive vehicle arranged for immediate transition as a transport unit from land to water or water to land without alteration, adjustment or adaptation.

A further object of the invention is to provide an improved association of means with a conventional land automobile, whereby the latter is adapted to function as a transport unit on both land and water.

A further object of the invention is to provide improved means in association with a conventional land automobile, whereby the power unit and controls of the latter are adapted to exercise their respective functions on either or both land and water.

A further object of the invention is to provide improved means associated with a conventional automobile chassis and operable to support the latter as a water transport unit.

A further object of the invention is to provide improved means for adapting the power unit of a conventional chassis for selective propulsion effect on both land and water.

A further object of the invention is to provide improved means for adapting the steering controls of a conventional automobile chassis to function for steering effect on both land and water.

A further object of the invention is to provide an improved construction and arrangement of elements readily adaptable to a conventional automobile chassis to render the latter available for operation as a water transport unit without impairing the land transport characteristics of said chassis, which construction and arrangement of elements is relatively simple, and inexpensive, highly efficient in operation, susceptible of practical development in a wide variety of specific sizes, styles, and capacities, and which materially extends the operative range and utility of the land vehicle wherewith it is associated.

My invention consists in the construction, arrangement, and combination of elements hereinafter set forth, pointed out in my claims, and illustrated by the accompanying drawings, in which—

Figure 2:
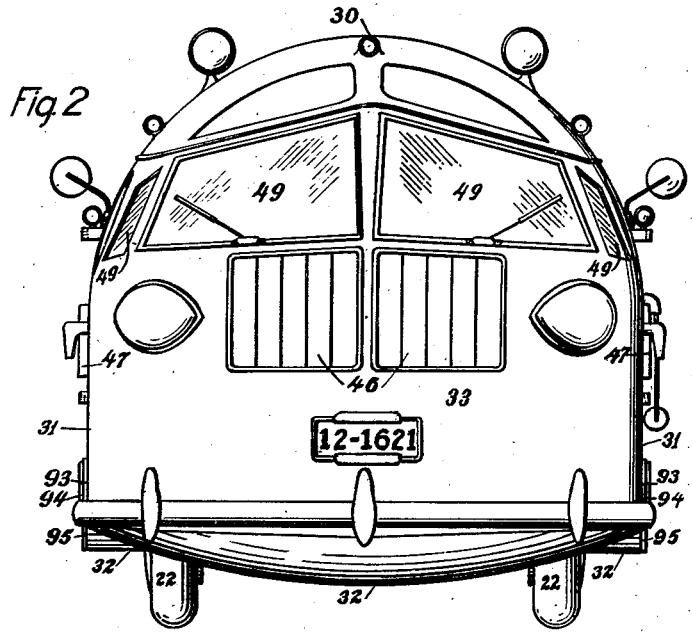
Figure 3:
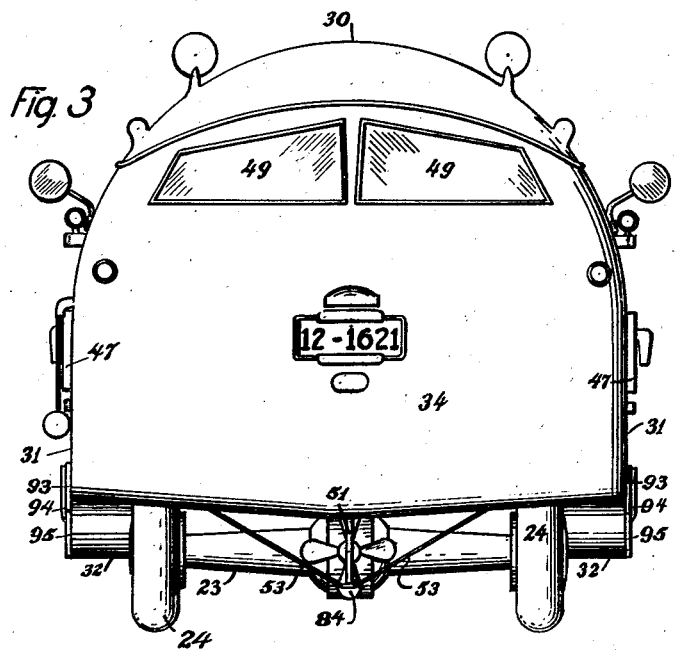

Figure 1 is a side elevation of a preferred embodiment of my invention as completely assembled and connected for practical use as a land and water transport unit. Figure 2 is a front end elevation, on a somewhat enlarged scale, of the arrangement shown in Figure 1. Figure 3 is a rear end elevation of the unit shown in Figure 1. Figure 4 is a bottom plan view of the showing of Figure 1. Figure 5 is a vertical section taken on the longitudinal median line of the unit illustrated in Figure 1. Figure 6 is a diagrammatic top plan view of the complete unit illustrating the relative position of conventional automobile elements incorporated in the unit. Figure 7 is a fragmentary, isometric, detail view of steering connections employed in the practical development of the invention. Figure 8 is a fragmentary, isometric, detail view of rudder means and connections employed for steering of the unit when afloat. Figure 9 is a fragmentary, detail elevation of foldable step and associated door means advantageously employed with the improved unit. Figure 10 is a cross section taken on the indicated line 10—10 of Figure 9. Figure 11 is a fragmentary, detail section of the propeller mounting and drive connections employed to propel the unit when afloat. Figure 12 is a fragmentary, detail section of a propeller shaft bracket advantageously employed as an element of the construction shown. Figure 13 is a fragmentary, isometric, detail section of a journal and thrust bearing construction advantageously employed to mount the propeller shaft in the arrangement shown. Figure 14 is an end elevation of the split-ring thrust bearing unit employed in the arrangement illustrated. Figure 15 is a fragmentary, isometric, detail view of propeller shaft drive means and connections employed in the improved unit. Figure 16 is a vertical section taken on the indicated line 16—16 of Figure 5. Figure 17 is a plan view, partly in section and on an enlarged scale, of power take-off means associated with the conventional transmission of an automotive chassis to drive the propeller element of the improved unit.

The invention consists, essentially, in the operative association with a conventional automobile chassis of an enclosed, buoyant body, so arranged as to buoy up and float the entire assembly without interfering with the normal operation of the chassis as a road vehicle, and in the provision of means and connections whereby the corresponding agencies of the conventional chassis may be employed to steer and propel the assembly when afloat.

In the drawings, the conventional automobile chassis is illustrated as including the usual rigid frame 20, a front axle 21 supported by steerable wheels 22, a rear axle 23 supported by driven wheels 24, a prime mover 25 carried by the forward portion of the frame in driving relation through a clutch assembly 26 with a selective speed transmission 27, which in turn connects to drive the wheels 24 through a drive shaft assembly 28, and with manually-operable steering means and connections 29 controlling the steerable wheels 22. All of the foregoing is strictly conventional in construction and arrangement and is illustrated merely to typify customary automobile chassis arrangements wherewith the novel features of the invention may be readily and advantageously associated.

Suitably supported on and in fixed relation with a chassis frame 20, a unitary body assembly in the form of a rigid, hollow, domed shell, having a width in excess of that of the chassis and a length greater than the chassis length, is disposed in the relative covering relation with said chassis indicated in the diagram of Figure 6, wherein it is indicated that the body portion projects laterally beyond the chassis an equal distance on each side of the latter and extends forwardly and rearwardly substantially like amounts beyond the corresponding chassis ends. The body enclosure of the vehicle may be of any specific form and construction suitable to its purpose, and is illustrated as comprising a transversely-arched, longitudinally straight roof portion 30 merging with substantially vertical side walls 31 which depend to connect with a horizontal bottom panel 32 underlying the portion of the automobile chassis intermediate its supporting axles, which top, side and bottom elements merge forwardly and rearwardly of the assembly in suitably streamlined form to comprise end enclosures 33 and 34 projecting oppositely beyond the chassis unit. The bottom panel 32 is bent upwardly beneath the power plant 25 to pass over the front chassis axle 21 and is then projected downwardly and forwardly a distance to merge with the downwardly-curved and forwardly-tapered front end section 33 to form a water-tight compartment forwardly of the power unit 25, downwardly-opening, water-tight wells being suitably provided just within the forward portions of the side walls 31 to freely receive and permit rotation as well as steering oscillation of the wheels 22, an auxiliary bottom panel 35 preferably bridging the upwardly-offset portion of the panel 32 and extending beneath the axle 21 to present a smoothly-contoured bottom portion and minimize eddy currents and resistances when the unit is afloat. In like manner, the rearward portion of the panel 32 is bent upwardly and then rearwardly to pass above the axle assembly 23 and is then extended rearwardly and downwardly to merge with the rearwardly and downwardly converging walls of the end portions 34 to form a water-tight compartment in said rear portion, the rear wheels 24 being suitably housed in downwardly-opening pockets formed inwardly of and adjacent the side walls 31. With the arrangement shown and described, the bottom panel 32 together with its forward and rearward extensions may cooperate with the side walls and forward and rearward extensions of the body assembly to form a water-tight, boat-like enclosure housing the automobile chassis with the exception of the wheel and axle assemblies of said chassis, the only elements of said automobile chassis requiring movable accommodation through the bottom panel 32 being an element of the steering assembly 29 and the drive shaft assembly 28, both of which elements may be movably sealed through appropriate portions of the bottom panel 32 in any suitable, convenient, and well-known manner. The body assembly extends laterally on each side beyond the automobile chassis and extends longitudinally both forwardly and rearwardly well beyond said chassis, thus providing a displacement of water when the vehicle is afloat which is more than sufficient to support the weight of the loaded vehicle without permitting the unit to sink to any great extent. While the cooperation of the bottom panel 32 with other body elements has been described as being such as will provide a water-tight hull portion of the unit, additional buoyant means are provided in an arrangement which will serve to competently float the unit even though the hull portion of the body assembly should prove to be permeable to water, such means comprising a plurality of sealed air tanks disposed within the body assembly in a manner to uniformly and adequately buoy up the weight of the unit. In the arrangement shown, similar, relatively-long tanks 36 are disposed along each of the long sides of the body assembly just above the bottom panel 32 and in position to extend longitudinally of the unit between and substantially filling the space intermediate a wheel 22 and the wheel 24 on the same side of the automobile chassis; an identical pair of relatively large tanks 37 is disposed transversely of and in substantially filling relation with the rear end enclosure 34 immediately above the rear portion of the bottom panel 32; an identical pair of relatively large tanks 38 is disposed transversely of and in substantially filling relation with the forepeak of the forward end enclosure 33; and a relatively long, shallow tank 39 is disposed transversely of the forward end enclosure 33 immediately above the forward extension of the bottom panel 32 and between the tanks 38 and forward end of the automobile chassis. The tanks 36, 37, 38, and 39 are suitably and permanently secured to the structure of the body assembly and represent a volume of displacement such as will adequately support the weight of the unit in water, the disposition of the tanks being such as will maintain the unit in level floating position and minimize the danger of capsizing.

The buoyant body assembly is of any specific construction suitable to provide a rigid, lightweight unit, and while illustrated as of single, thin-walled form, would no doubt in practice, take the form of a typical arched rib frame suitably braced and covered smoothly with weather and water resistant material. Whatever be its specific construction, the body assembly is securely attached to frame elements of the automobile chassis in a manner to mount said body assembly for land transportation on and by said chassis, and to mount said chassis for water transportation on and by said body. The interior of the body assembly may be arranged and finished in any manner suitable to adapt the transport unit for the specific use or function contemplated, and the drawings illustrate an interior arrangement particularly adapted for human transport. In the arrangement shown, a forward deck or horizontal baffle 40 laterally traverses the front end section 33 above the tanks 38 and 39 to close against the side portions of said front end section, said deck 40 extending longitudinally of the body assembly from the apex of the front end section to and across the conventional cooling radiator unit 41 of the automobile chassis, thence rearwardly across and above the power unit 25, whereafter it is inclined downwardly to form an instrument panel 42 thus disposed transversely of the body assembly in conventional relation with the controls of the automobile chassis, and is thence extended downwardly as a fire wall 43 sealed transversely of the body assembly just rearwardly of the power unit 25, and is continued through an inclined portion 44 to fixed connection with the forward margin of a floor deck 45. The front deck 40 is disposed at an elevation such as will permit free circulation of air through the cooling radiator 41 and about the power unit 25, the air thus circulated entering the front end section 33 through adjustable louvres 46 disposed in air-flow regulating relation across suitable openings formed adjacent and on opposite sides of the forward apex of the body assembly immediately below the front deck 40 and above the tank 33, and leaving the body assembly through adjustable louvres 47 disposed in regulating relation with openings formed in the opposite side walls 31 of the body assembly immediately below the rearward extension of the deck 40 and just forward of the fire wall 43, which arrangement makes possible a continuous supply and circulation of air for cooling purposes through the cooling radiator 41, about the power unit 25, and outwardly of the body assembly for the elimination of fumes and gases developed through power unit operation.

The floor deck 45 is sealed horizontally across the body assembly between its side walls 31 in spaced, parallel relation with and above the panel 32, the tanks 36 being thus received between said panel 32 and deck 45, and the floor deck is extended rearwardly of the body assembly in upwardly-stepped relation to clear operative elements of the unit and the tank 37, and closes against and is sealed to the converging side walls of the rear end section 34, said decks 40 and 45 thus combining to form a partition longitudinally of the body assembly which separates the passenger compartment of the vehicle from the operative and flotation elements of the unit. The floor deck 45 supports seat units and assemblies 48 disposed and arranged in any suitable or convenient manner to accommodate a plurality of passengers in forwardly-facing relation interiorly of the body assembly, one of said seats being disposed adjacent the steering and other controls of the automobile chassis for convenient occupancy by an operator. The side walls 31, as well as the extensions of said walls forming the front and rear end sections 33 and 34, are provided with suitably-arranged windows 49 in such number and specific relation as may be adequate and desirable for ventilation and the admission of light, and hinged doors 50 are disposed to open through midportions of the side walls 31 above the front deck 45 for access to the interior of the body assembly for convenient ingress and egress.

The normal and usual steering connections are employed to actuate the steerable wheels 22 about their vertical spindles and thereby control and steer the unit when employed as a land transport, and the same connections are utilized to control and actuate a rudder element for steering of the unit when employed as a water transport. Any suitable specific construction and linkage for the rudder element may, of course, be employed, but the arrangement illustrated and hereinafter described has been found to be adequate in practical use. The rudder employed is a substantially rectangular plane member 51 vertically disposed beneath the longitudinal median line of the rearward extension of the panel 32, said member 51 being provided with aligned pins 52 extending oppositely from its upper and lower margins for engagement in fixed journal bearings carried by the body assembly, the upper of said bearings being carried by the rearward extension of the panel 32 and the lower of said bearings being positioned and supported by a bracket yoke 53 depending from and in fixed relation with the rear portion of the automobile chassis, the member 51 being thus mounted for actuation about a vertical hinge axis which approximately bisects said member. To actuate and control the member 51, the latter is provided with a perpendicularly-related arm 54 projecting in fixed relation from one side of said member, the outer end of said arm engaging pivotally or hingedly through a joint 55 with the rearward end of a link 56 which is disposed longitudinally beneath the bottom panel 32, in offset relation above the rear axle 23, and extends through a suitable guide or slide bearing 57, carried by said bottom panel, to a termination adjacent the front axle 21 of the unit. A bell crank 58 is pivoted by means engaging through its angle to the underside of the axle 21 and is disposed with one of its arms substantially parallel with said axle and the other of its arms projecting rearwardly therefrom in substantially parallel relation with the link 56, and the forward end of said link 56 hingedly or pivotally connects through a joint 59 with the free end of the bell crank arm which is parallel to the axle 21. The conventional steering connections of the automobile chassis include a drag link 60 which connects between the spindle arms of the steerable wheels and is adapted to move laterally of the vehicle assembly under the actuating control of the steering wheel and column 29, and an arm 61 is fixedly secured to and in depending relation with the drag link 60 for operative connection, through suitable hinged or pivotal joints 62 and 63 engaging the opposite ends of a link 64, with the free end of the bell crank arm extending rearwardly from the axle 21, so that, as the steering wheel and column assembly 29 of the automobile chassis is operated, on either land or water, the resultant travel of the drag link 60 is transmitted through the link 64, bell crank 58, link 56, and arm 54 to change the aspect of the rudder member 51 for steering reaction against the medium of flotation which corresponds with the steering reaction of the wheels 22 when the unit is operated on land. Thus, steering of the unit is accomplished through the same means and in exactly the same manner when said unit is operating on either land or water, there being no necessity for connecting or disconnecting any of the steering means or elements to change from one type of transport operation to the other.

As above pointed out, propulsion of the unit when employed as a land transport is accomplished through power derived from the prime mover 25 through a conventional transmission 27, drive shaft assembly 28, rear axle 23 and wheels 24, and the conventional transmission 27 is equipped with a gear-shift lever 65 which is movable to a variety of positions for the selection of desired gear ratios, a neutral position for said gear-shift lever being provided wherein no driving connection is had between the power unit and the drive shaft assembly, as is usual practice. Propulsion of the unit when afloat is accomplished through a power take-off associated with the transmission 27 and arranged for selective actuation of a water wheel or screw-type propeller disposed adjacent the rudder member 51. The power take-off may, naturally, vary widely in its specific construction and operative connection with the propeller element, but the arrangement illustrated and hereinafter described has proved to be practical, convenient, susceptible of development through means and agencies readily available, and highly efficient in operation. As illustrated in Figure 17, the conventional transmission 27 includes a gear 66 in fixed relation on a shaft element 67 which is connectible through the usual clutch assembly with the driven shaft of the power unit for rotation simultaneously with actuation of the power unit when the intermediate clutch assembly is engaged. The transmission 27 includes a jack shaft 68 in constantly and oppositely driven relation with the shaft 67 through the gear 66, and other elements, not shown, not essential to an understanding of the instant invention. The power take-off utilized in the invention is illustrated as comprising a suitable housing 69 secured to one side of the transmission 27 and communicating with the interior of the latter transmission through registering openings in the contacting sides of the associated housings, a jack shaft 70 journaled for rotation in the housing 69 in axially-parallel relation with the shafts 67 and 68, a gear 71 fixed to the shaft 70 in meshing relation with the gear 66, a second gear 72, of reduced diameter, fixed to the shaft 70, a gear shaft 73 journaled for rotation in the housing 69 in spaced, parallel relation with the shaft 70, a power shaft 74 journaled in said housing 69 in spaced, parallel relation with the shaft 73 and in constantly driven relation with said latter shaft through meshing gears 75 and 76, and axially-shiftable gears 77 and 78 feathered to the shaft 73, a gear shift lever 79 being operatively associated with the housing 69 for selective positioning of the shiftable gears of the power take-off. With the arrangement shown, it is obvious that the shaft 70 is caused to rotate simultaneously with actuation of power unit whenever the intermediate clutch is engaged, and that said shaft is driven whether or not any of the gears of the transmission 27 or of the power take-off within the housing 69 are not engaged; and that, through selective engagement of the gears 76, 77, and 78 with corresponding gears of the jack shaft 70, through the agency of the shift lever 79, the power shaft 74 may be rotated at varying speeds and, if desired, in opposite directions. It should be apparent that the power shaft 74 may be rotated when the gears of the transmission 27 are engaged to rotate the drive shaft 28, but preferably actuation of the power shaft 74 is had with the gear shift lever 65 of the conventional transmission 27 in its neutral position, all of the available power from the prime mover being then applied to rotation of said shaft 24. The power shaft 74 extends rearwardly through the housing 69 and longitudinally of the unit below the floor panel 45 in laterally-offset, substantially parallel relation with the drive shaft assembly 28 and terminates somewhat forwardly of the upwardly-extended rear portion of the panel 32, said shaft 74 being supported in suitable bearings and carrying a belt pulley or multiple sheave 80 in fixed relation on its rearward end. The sheave 80 is operatively connected, by means of belts 81, with a corresponding sheave 82 fixed to the forward end of a propeller shaft 83 operatively disposed on the longitudinal median line of the unit above the rear portion of the drive shaft assembly 28 and in rearwardly and downwardly inclined relation across the rear axle assembly 23, and a suitable screw-type propeller 84 is fixed to the rearward end of the shaft 83, for rotation with the latter, beneath the rearward extension of the panel 32 and forwardly of the rudder member 51. The propeller shaft 83 intersects the upwardly-extended rear portion of the panel 32 and is secured through said panel portion by means of a construction constituting a journal and thrust bearing of the type illustrated in Figures 11, 13 and 14. The bearing supporting the forward portion of the propeller shaft 83 comprises a hollow, cup-like, cylindrical casing 85 permanently fixed in intersecting relation with the proper portion of the panel 32 and disposed with its open end directed rearwardly, a suitable member 86 in removable closing relation with the otherwise open outer end of the casing 85, and registering holes in the member 86 and closed end of the casing 85 adapted to freely receive and permit rotation of the shaft 83. That portion of the shaft 83 received within the casing 85 is formed with a radially-extended annular boss or web 87 disposed equidistant from the closed ends of the casing, and with annular recesses on each side of the boss 87 of a width sufficient to position their outer shoulders in the planes of the casing end enclosures. Diametrically-divided thrust washers 88 of the type shown in Figure 14 are provided to seat in the annular recesses on each side of the boss 87 and to be clamped into their respective seats against axial displacement therefrom and for bearing engagement of their outer surfaces against the end closures of the casing 85 and similar bearing engagement of their inner faces against adjacent surfaces of the boss 87, thus holding the shaft 83 against axial displacement relative to the casing 85. The washers 88 permit free rotation of the shaft 83 within their central apertures, thereby providing a forward journal bearing for said shaft, and suitable means, such as a fitting 89, is provided for the introduction of suitable heavy lubricant to the interior of the casing 85 to seal the latter against seepage of water through the assembly, while minimizing friction developed through rotation of the shaft 83. The rear end of the shaft 83 is carried by and rotatably supported in a journal bearing formed through the lower end of a strut 90 depending in fixed relation from the rearward extension of the panel 32, such a journal bearing being found adequate when in the form of a straight bushing 91 of friction-resistant metal, to which lubricant may be supplied from time to time through a fitting 92 communicating through the foot of the strut 90 with the interior bore of said bushing.

Since the unit, when afloat, sinks to a water line as high as or perhaps slightly above the level of the floor panel 45, it is desirable that the openings closed by the doors 50 terminate above the normal water line, and are so shown. Hence, when the unit is employed as a land transport, it is essential that step means be provided intermediate the ground and the door sill to facilitate entrance to and exit from the body assembly. Figures 9 and 10 illustrate a practical and convenient construction and arrangement of folding step means operatively associated with an adjacent door in a manner to extend the step for use when the door is opened and to fold said step against the exterior of the body assembly when the door is closed. In the arrangement shown, the step is illustrated as a rectangular plate 93 hinged at one of its long margins on a horizontal axis to a portion of the side wall 31 beneath a door 50, and adapted to project horizontally outward from said hinge axis adjacent the lower margin of said side wall, a brace 94 being hinged at one end to the midportion of the free margin of the step 93 and being provided with a T-head on its other end adapted to reciprocate in a vertical slide bearing 95 fixed to the side wall 31 beneath the step 93 and provided with a closed lower end adapted to act as a stop for the brace 94 when the step 93 is horizontally extended. An actuating arm 96, having a curved portion concentric with the hinge axis of the step 93, is fixed at one end to a point adjacent the free margin of the step 93 and also adjacent the hinged side of the door 50, and extends inwardly and slidably through the side wall 31, the inner end of the arm 96 connecting through swivel joints 97 and a link 98 with a bracket 99 fixed to and extending inwardly from a lower portion of the door 50 adjacent its hinge margin, so that, when said door is opened and the bracket 99 swung outwardly, the pull thus exerted on the link 98 acts to swing the arm 96 outwardly for extension of the step 93 in position for use, while closing of said door acts to reverse the direction of travel of the arm 96 for repositioning of the step 93 in folded relation against the side wall 31, as shown in Figure 10.

Since many changes, variations, modifications, and alterations, in the specific form, construction, and arrangement of the elements shown and described may be had without departing from the spirit of my invention, and may in fact be necessary in adapting the principles of the invention to use with specific constructions of automobile chassis, I wish to be understood as being limited solely by the scope of the appended claims, rather than by any details of the illustrative showing and foregoing description.

I claim as my invention—

1. In an amphibian transport unit having a conventional wheeled, steerable, automobile chassis in fixed association with a buoyant, boat-like body adapted to support the combined unit in water, and power means on said chassis connecting through a selective-speed transmission with wheels of said chassis for power propulsion of the unit on land, selectively-engageable means for the propulsion of said unit on water, said means comprising a second selective-speed transmission disposed laterally adjacent and operatively engaged in driven relation with said first transmission, a driven shaft in said second transmission journaled for rotation longitudinally of the transport unit within said body, a propeller shaft offset laterally from said driven shaft and journaled for rotation in and in intersecting relation with said body, a water wheel fixed to the exterior end of said propeller shaft for propulsion of the transport unit on water as a consequence of propeller shaft rotation, and means operatively interconnecting the rearward end of said driven shaft of said second transmission with the forward end of said propeller shaft to transmit rotation of the former to effect simultaneous rotation of the latter.

2. In an amphibian transport unit having a buoyant, boat-like body in flotative supporting relation with a conventional powered automobile chassis including steerable wheel elements interconnected for simultaneous actuation by a link reciprocable laterally of the unit under the control of manually-operable steering means and connections, means for the directional control of said unit on water, said means comprising a rudder hinged to and in depending relation beneath said body, an actuating arm fixed to and projecting laterally of the unit from said rudder, an arm in fixed, depending relation with the link operatively interconnecting said steerable wheels, a bell crank pivotally secured at its angle to a fixed element of the transport unit adjacent said link, means operatively connecting one arm of said bell crank with the arm carried by said link, and a push and pull member operatively connecting the other arm of said bell crank with the actuating arm of said rudder, whereby said rudder is engaged for actuation by said manually-operable steering control means.

3. In an amphibian transport unit having a buoyant, boat-like body enclosure in fixed, flotatively-supporting relation with a conventional automobile chassis, and hinged doors swingable through horizontal arcs opening through walls of said body enclosure above the normal water line of the unit when afloat, foldable step means exteriorly of said body enclosure adjacent and in operative association with each of said doors to facilitate entrance to and exit from said body enclosure, each of said step means comprising a shelf hinged at one margin to an exterior wall of said body enclosure in spaced relation beneath an adjacent door opening for projection at times in a horizontal plane, a brace hinged to the outer margin of said shelf and formed with a head on its depending end reciprocably engaged in a vertically-disposed slide bearing fixed to said enclosure wall beneath said shelf, stop means associated with said slide bearing for engagement by said brace head when said shelf is disposed in a horizontal plane, and link means operatively connecting said door and shelf to automatically position the latter as an incident of door operation in folded relation against the enclosure wall when said door is closed and in horizontal projection outwardly from said enclosure wall when said door is open.

4. In an amphibian transport unit having a conventional wheeled, steerable, automobile chassis powered for self-propulsion, means associated with said chassis for the flotative support thereof in water, said means comprising a substantially flat, bottom panel fixed in laterally and longitudinally projecting relation beneath said chassis and formed with offset portions adapted to accommodate the chassis wheels for ground engagement, a floor panel coextensive with said bottom panel fixed to and in covering relation with said chassis in spaced relation above said bottom panel, vertical offsets in said floor panel adjacent the opposite ends of said chassis, side walls sealed to and filling the space between aligned margins of said bottom and floor panels to complete a flotation compartment enclosing said chassis, and buoyant tanks symmetrically disposed in side and end portions of said flotation compartment exteriorly of said chassis.

WENDLIN P. GRABBE.